(12) United States Patent
Jeon et al.

(10) Patent No.: US 8,004,559 B2
(45) Date of Patent: Aug. 23, 2011

(54) APPARATUS FOR MEASURING THREE DIMENSIONAL SHAPE

(75) Inventors: Moon Young Jeon, Anyang-si (KR); Min Young Kim, Seoul (KR)

(73) Assignee: Koh Young Technology Inc., Seoul (KR)

( * ) Notice: Subject to any disclaimer, the term of this patent is extended or adjusted under 35 U.S.C. 154(b) by 1213 days.

(21) Appl. No.: 11/710,903

(22) Filed: Feb. 27, 2007

(65) Prior Publication Data

US 2007/0223805 A1 Sep. 27, 2007

(30) Foreign Application Priority Data

Mar. 23, 2006 (KR) .................. 10-2006-0026642

(51) Int. Cl.
*G01B 11/00* (2006.01)
(52) U.S. Cl. .................. 348/49; 356/634; 382/154
(58) Field of Classification Search .................. 348/49; 356/625–636; 382/154
See application file for complete search history.

(56) References Cited

U.S. PATENT DOCUMENTS

| | | | |
|---|---|---|---|
| 5,519,535 A | 5/1996 | Mok | |
| 5,708,498 A | 1/1998 | Rioux et al. | |
| 5,847,832 A | 12/1998 | Liskow et al. | |
| 6,166,810 A * | 12/2000 | Nakayama et al. | 356/624 |
| 6,529,268 B1 | 3/2003 | Oka et al. | |
| 2004/0021875 A1 | 2/2004 | Northby | |

FOREIGN PATENT DOCUMENTS

| | | |
|---|---|---|
| CN | 2466768 | 12/2001 |
| CN | 1748120 | 3/2006 |
| GB | 2157419 | 10/1985 |
| JP | 56-125606 | 10/1981 |
| JP | 5-187832 | 7/1993 |
| JP | 06-109437 | 4/1994 |
| JP | 7-19825 | 1/1995 |

(Continued)

OTHER PUBLICATIONS

Communication from the German Patent Office dated Dec. 4, 2008 with regard to the counterpart German Application 102007011631.6-54.

(Continued)

*Primary Examiner* — Moustafa M Meky
(74) *Attorney, Agent, or Firm* — Kile Park Goekjian Reed & McManus PLLC

(57) ABSTRACT

An apparatus for measuring a 3-dimensional (3D) shape which can remove a shadow, which may occur when measuring the 3D shape, and also can measure a reflected light from an external surface of a test object, is provided. The apparatus for measuring a 3D shape includes a projection part 10 generating a light, an image formation part 20 sensing the light, a prism part 30 being provided between the projection part 10 and the viewing part 20, and a first mirror part 40 and a second mirror part 50 being provided in both ends of the prism part 30. Also, the prism part 30 selectively transmits the light generated from the projection part 10 to the first mirror part 40 and the second mirror part 50 to be directed towards an external surface of a test object 1. When the light reflected from the external surface of the test object 1 is selectively transmitted to the first mirror part 40 and the second mirror part 50 and thereby reflected, the prism part 30 transmits the reflected light to the viewing part 20.

19 Claims, 10 Drawing Sheets

FOREIGN PATENT DOCUMENTS

| | | |
|---|---|---|
| JP | 2000-506970 | 6/2000 |
| JP | 2003-254732 | 9/2003 |
| JP | 2005-227246 | 8/2005 |
| WO | WO03/032252 | 4/2003 |
| WO | WO2004/070316 | 8/2004 |

OTHER PUBLICATIONS

Communication from the Japanese Patent Office dated Sep. 16, 2008 with regard to the counterpart Japanese Application 2007-60313.

Communication from the Chinese Patent Office dated May 9, 2008 with regard to the counterpart Chinese Application 200710086747.3.

Communication from the Chinese Patent Office dated Dec. 26, 2008 with regard to the counterpart Chinese Application 200710086747.3.

Communication from the Japanese Patent Office dated Jan. 26, 2010 with regard to the counterpart Japanese Application 2007-060313.

German PTO Office Action, Application No. 10 2007 011 631.6-54, dated Sep. 24, 2010.

\* cited by examiner

APPARATUS FOR MEASURING THREE DIMENSIONAL SHAPE

BACKGROUND OF THE INVENTION

1. Field of the Invention

The present invention relates to an apparatus for measuring a 3-dimensional (3D) shape, and more particularly, to an apparatus for measuring a 3D shape, which has a simple configuration of an optical system, and can remove a shadow, which may occur when measuring a 3D shape, and also can measure only a reflected light.

2. Description of the Related Art

As shown in FIG. 1, a conventional 3D shape measuring apparatus includes a first inspection part 2 and a second inspection part 3. Each of the first and second inspection parts 2 and 3 includes a projection part 4, a beam splitter 5, and an image formation part 6. More specifically, the projection part 4 includes a light source 4a, a grating 4b, and a projection lens 4c, and the viewing part 6 includes a viewing lens 6a and a camera 6b.

Hereinafter, the first inspection part 2 and the second inspection part 3 will be described with reference to the accompanying drawings.

When a light is generated from the light source 4a of the projection part 4 of the first inspection part 2 towards an arrow direction A, the generated light is transmitted to an external surface of a measuring object 1 via the grating 4b, the projection lens 4c, and the beam splitter 5, which are included in the first inspection part 2. The transmitted light is reflected along the arrow direction A from the external surface of the test object 1, and then transmitted to the camera 6b via the beam splitter 5 and the image formation lens 6a, which are included in the second inspection part 3. A 3D shape of the test object 1 is measured by sensing a light image via the camera 6b.

The conventional 3D shape measuring apparatus includes a first inspection part and a second inspection part, which are symmetric to each other, to remove a shadow which may occur when measuring a 3D shape of a test object. Each of the first inspection part and the second inspection part includes a projection part, a beam splitter, and an image formation part. Therefore, a configuration of an optical system becomes very complex.

SUMMARY OF THE INVENTION

It is object of the present invention to provide an apparatus for measuring a 3D shape which can remove a shadow, which may occur when measuring a 3D shape of a test object, and also can measure a reflected light from a surface of the measuring object.

It is another object of the present invention to provide an apparatus for measuring a 3D shape which has a simple configuration of an optical system.

To accomplish the above object of the present invention, according to an aspect of the present invention, there is provided a 3-dimensional (3D) shape measuring apparatus comprising a projection part generating a light; an image formation part sensing the light; a prism part being provided between the projection part and the viewing part; and a first mirror part and a second mirror part being provided in both ends of the prism part respectively, wherein the prism part selectively transmits the light generated from the projection part to the first mirror part and the second mirror part to be directed towards a surface of a test object, and selectively transmits a reflected light to the viewing part.

BRIEF DESCRIPTION OF THE DRAWINGS

The above and other objects and advantages of the present invention will become more apparent by describing the preferred embodiments thereof in more detail with reference to the accompanying drawings in which:

FIG. 3b is a cross-sectional view illustrating a C-C line of a flexure stage illustrated in FIG. 3a;

DETAILED DESCRIPTION OF THE INVENTION

Preferred embodiments of the present invention will be described in detail with reference to the accompanying drawings.

I. First Embodiment

Figure 1:
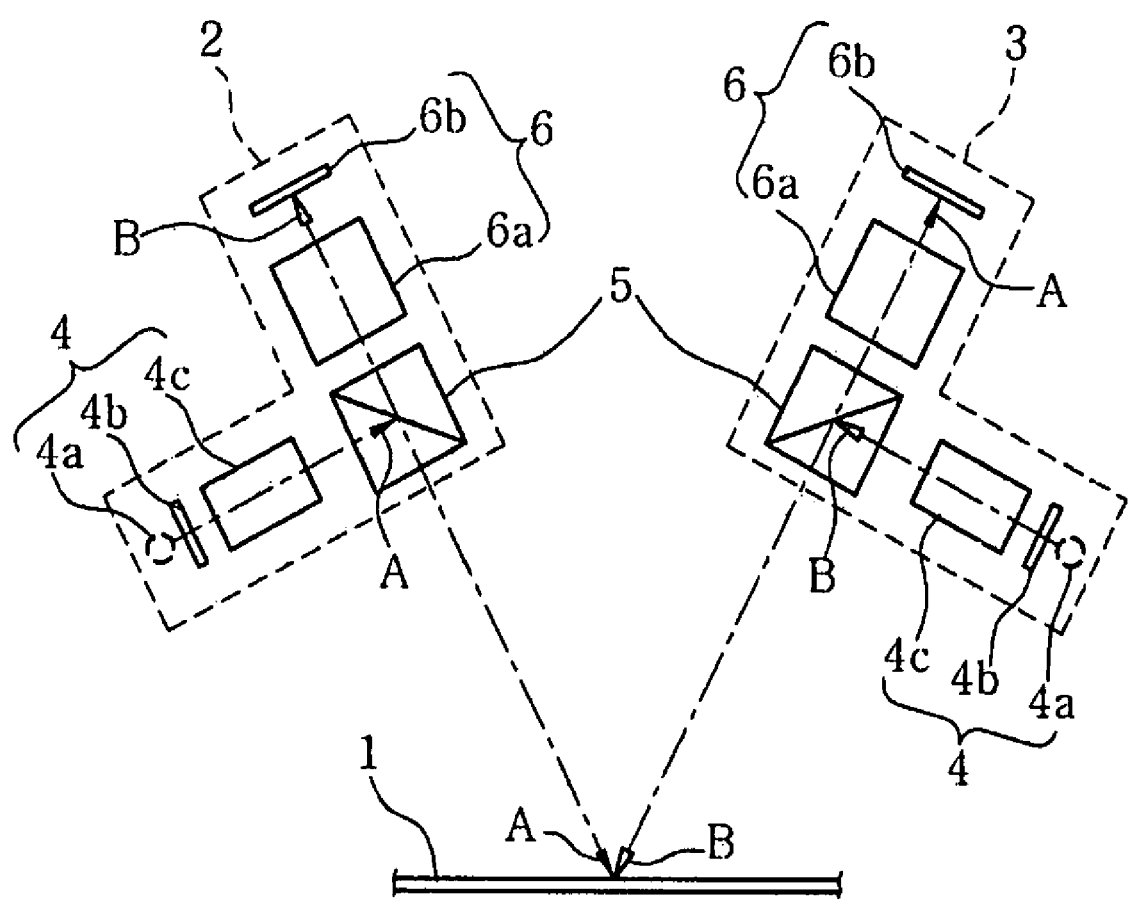
FIG. 1 is a configuration diagram illustrating a 3D shape measuring apparatus according to a conventional art.
Figure 2:
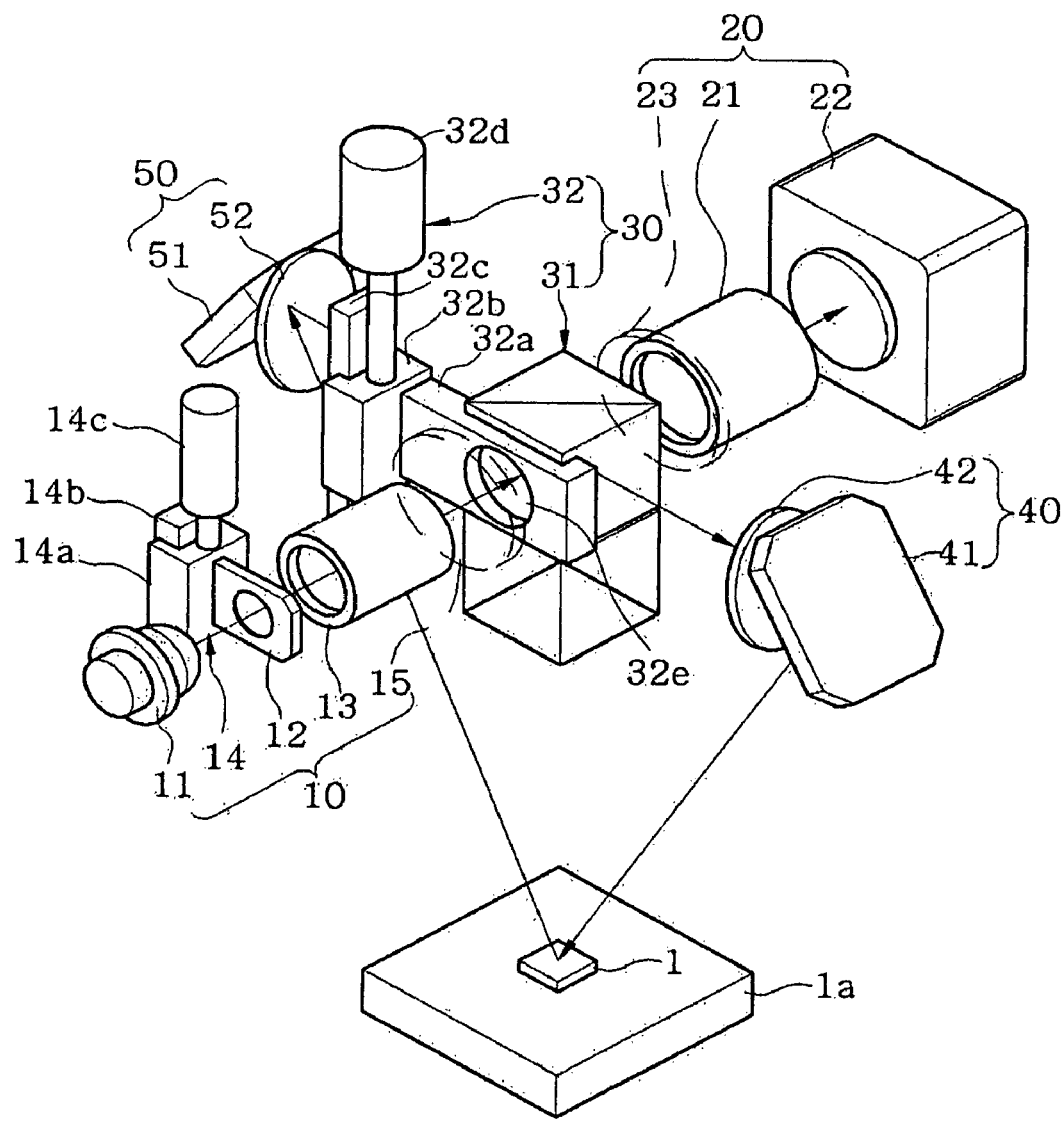
FIG. 2 is a perspective view illustrating a configuration of a 3D shape measuring apparatus according to a first embodiment of the present invention.

As shown in FIG. 2, a 3D shape measuring apparatus according to the present invention includes a projection part 10, an image formation part 20, a prism part 30, a first mirror part 40, and a second mirror part 50.

The projection part 10 includes a light source 11, a first grating 12, a projection lens 13, a first linear motion mechanism 14, and a first filter 15.

In the projection part 10, the light source 11 generates a light, the first grating 12 is provided between the light source 11 and the projection lens 13 to change the light generated from the light source 11 into a light according to a moire pattern, and transmit the changed light. When measuring a 3D shape of a test object 1 placed on an inspection table 1a and in this instance, the first grating 12 changes the light, which is transmitted an N number of times when an N-bucket algorithm is employed by the first linear motion mechanism 14, into the light according to moire pattern and transmits the changed light.

The light in the moire pattern is directed towards the projection lens 130, and the projection lens 13 is provided between the first grating 12 and the prism part 30 to filter the directed light via the first filter 15 and is transmitted the filtered light towards the prism part 30.

The first linear motion mechanism 14 is provided in one end of the first grating 12 to vertically move the first grating 12. Also, the first linear motion mechanism 14 includes a first moving block 14a, a first LM (Linear Motion) guide 14b, and a first actuator 14c. The first grating 12 is mounted to the first moving block 14a, and the first moving block 14a is mounted to the first LM (Linear Motion) guide 14b to guide the first moving block 14a for a linear motion movement. Also, the first actuator 14c is provided to the first moving block 14a to generate a drive power for linearly moving the first moving block 14a. Here, a piezoelectric (PZT) actuator is utilized for the first actuator 14c.

Figure 3A:
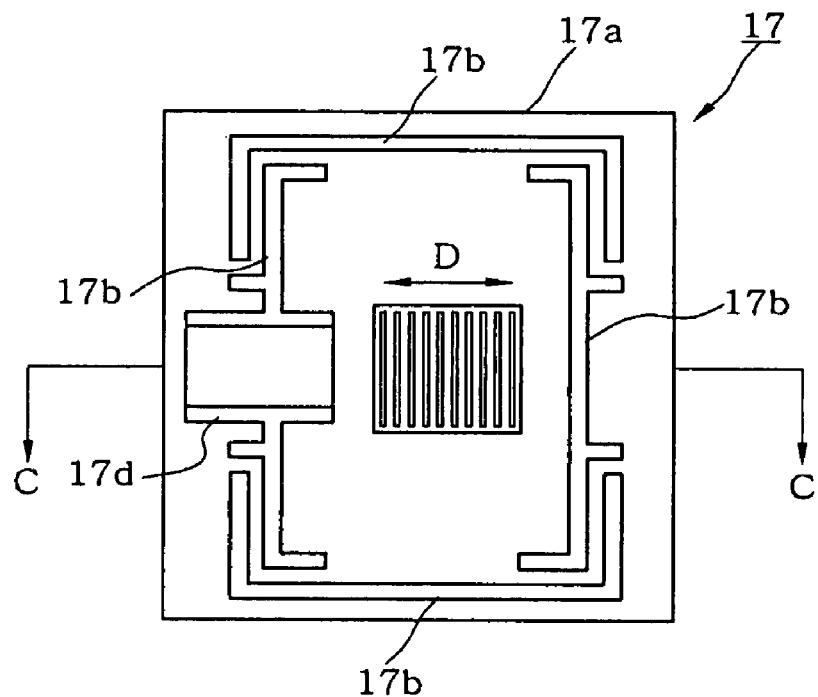
FIG. 3a is a top view illustrating another embodiment of a first linear motion mechanism of FIG. 2.
Figure 3B:
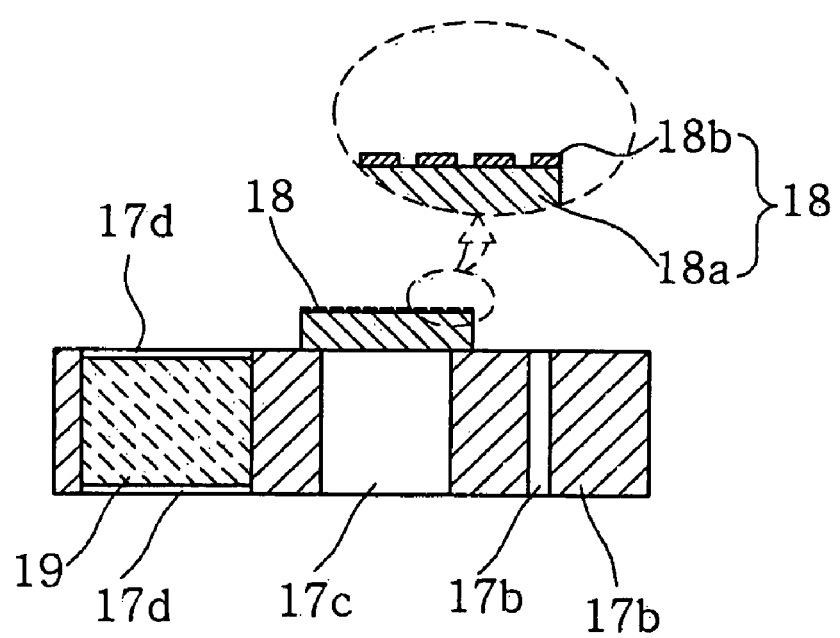

According to another embodiment of the present invention, a flexure stage 17 shown in FIGS. 3a and 3b may be utilized for the first linear motion mechanism 14. In this instance, the flexure stage 17 includes a flexure body 17a, a second grating 18, and a PZT actuator 19. Also, the flexure body 17a includes a plurality of holes 17b, a first installation hole 17c, and a second installation hole 17d for a flexure mechanism. The second grating 18 is placed on the first installation hole 17c, and the PZT actuator 19 is inserted into the second installation hole 17d.

The plurality of holes 17b is formed in the flexure body 17a for the flexure mechanism to linearly move the second grating 18 into an arrow direction D through a contraction/expansion by the PZT actuator 19. Also, the first installation hole 17c and the second installation hole 17d are formed in a center and one side of the flexure body 17a to install the second grating 18 and the PZT actuator 19 respectively. Specifically, the second grating 18 formed with a plurality of chrome patterns 18b on a glass substrate 18a is placed on the first installation hole 17c. The light directed towards the second grating 18 passes through the second grating 18 and the first installation hole 17c, and thereby reaches the external surface of the test object 1.

The PZT actuator 19 including a feedback sensor (not shown) is inserted into the second installation hole 17d to linearly move the second grating 18 which transmits the light generated from the projection part 10 towards the external surface of the test object 1. When the drive power is generated from the PZT actuator 19, the drive power contracts/expands the flexure body 17a and thereby linearly moves the second grating 18 into the arrow direction D as shown in FIG. 3a. Also, when employing the N-bucket algorithm to measure the 3D shape, the second grating 18 is moved the N number of times which is the same as the first grating 12.

The light having passed through the second grating 18, which is moved by the flexure stage 17, is directed towards the external surface of the test object 1 and reflected therefrom and then directed towards the viewing part 20.

As shown in FIG. 2, the viewing part 20, which receives the light reflected from the external surface of the test object 1, is provided in an identical axis to be at the same height with the projection part 10 and the prism part 30. Also, the viewing part 20 includes a viewing lens 21, a camera 22, and a second filter 23 so as to sense the reflected light from the test object 1. The image formation lens 21 receives the light which is reflected from the prism part 30 and then filtered and transmitted via the second filter 23. The light received by the image formation lens 21 is taken by the camera 22. When measuring the 3D shape, the camera 22 receives a light, which is reflected an N number of times from the external surface of the test object 1 when the N-bucket algorithm is employed, and takes the image the N number of times. Images of the test object 1, which are taken the N number of times by the camera 22, are utilized as information to output a phase via an image processing part (not shown) and a control part (not shown). The 3D shape of the test object 1 is outputted by using the phase information.

The prism part 30 includes a prism assembly 31 and a second linear motion mechanism 32. The prism part 30 selectively transmits the light having passed through the projection part 10 to the first mirror part 40 and the second mirror part 50 to be directed towards the external surface of the test object 1. When the light reflected from the external surface of the test object 1 is selectively transmitted to the first mirror part 40 and the second mirror part 50 and thereby reflected, the prism part 30 transmits the reflected light to the viewing part 20. Here, the first mirror part 40 and the second mirror part 50 are provided in both ends of the prism part 30.

Figure 4:
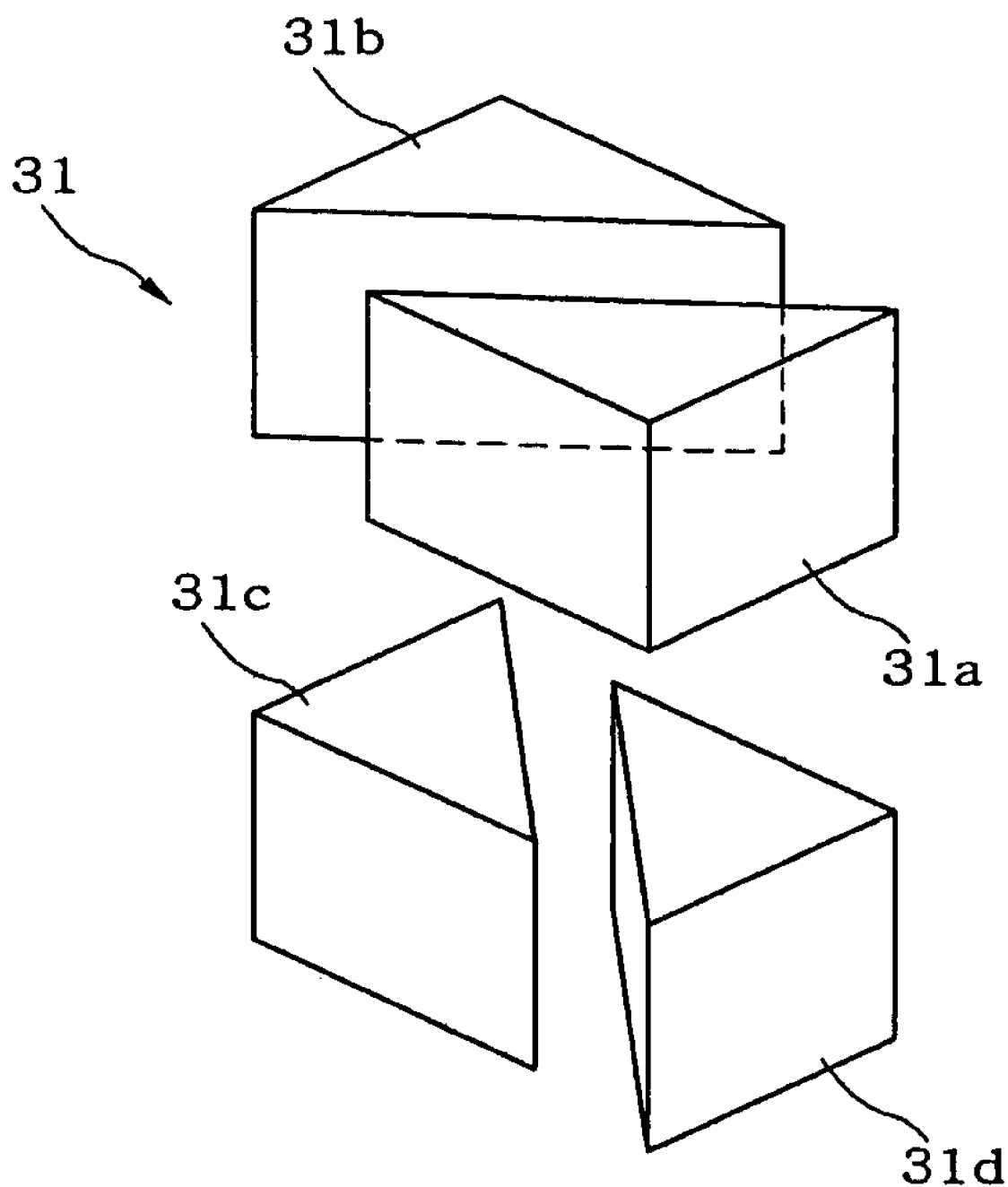
FIG. 4 is an enlarged exploded perspective view illustrating a prism assembly of FIG. 2.

As shown in FIG. 4, the prism assembly 31 includes a first prism mirror 31a, a second prism mirror 31b, a third prism mirror 31c, and a fourth prism mirror 31d. Also, a reflection surface (not shown) capable of reflecting a light towards the external surface and an inner surface of the test object 1 is formed on each of the first through fourth prism mirrors 31a, 31b, 31c, and 31d.

The first prism mirror 31a reflects the light generated from the projection part 10 towards the first mirror part 40, and the second prism mirror 31b reflects the reflected light via the second mirror part 50 towards the viewing part 50. Also, the third prism mirror 31c reflects the light generated from the projection part 10 towards the second mirror part 50, and the fourth prism mirror 31d reflects the light reflected via the first mirror part 40 towards the viewing part 20.

Each of the first through fourth prism mirrors 31a, 31b, 31c, and 31d has a section in a shape of a right-angled equilateral triangle to reflect the light. When the light passes through the first through fourth prism mirrors 31a, 31b, 31c, and 31d in the shape of the right-angled equilateral triangle, the light firstly passes a surface which includes any one between two segments, which constitute the right-angle, and then is reflected on an inclined plane.

Hereinafter, a method of assembling the prism assembly 31 reflecting the light via the inclined plane will be described. The inclined plane of the first prism mirror 31a and the inclined plane of the second prism mirror 31b are bonded to each other by using glues. Also, the inclined plane of the third prism mirror 31c and the inclined plane of the fourth prism mirror 31d are bonded to each other by using glues. When the inclined planes of the first and second prism mirrors 31a and 31b, and the inclined planes of the third and fourth prism mirrors 31c and 31d are bonded to each other respectively, a bottom surface of the first and second prism mirrors 31a and 31b and a top surface of the third and fourth prism mirrors 31c and 31d are bonded to each other by using glues. Through the above-described process, the prism assembly 31 is assembled. The prism assembly 31 is vertically moved by the second linear motion mechanism 32.

As shown in FIG. 2, when a measuring operation is completed by aligning the first and second prism mirrors 31a and 31b of the prism assembly 31 between the projection part 10 and the viewing part 20, reflecting the light generated from the projection part 10 towards the external surface of the test object 1, and then towards the viewing part 20, the second linear motion mechanism 32 vertically moves the prism assembly 31 to position the third and fourth prism mirrors 31c and 31d between the projection part 10 and the viewing part 20.

The second linear motion mechanism 32 includes a connecting member 32a, a second moving block 32b, a second LM (Linear Motion) guide 32c, and a second actuator 32d.

A hole 32e is formed on the connecting member 32a to pass the light generated from the projection part 10. The prism assembly 31 is provided to a portion where the hole 32e is formed. The second moving block 32b is provided in an end of the connecting member 32a. The second moving block 32b is installed to the second LM (Linear Motion) guide 32c so that the second moving block 32b may be guided by the second LM (Linear Motion) guide 32c and thereby linearly moved into a vertical direction. The second actuator 32d is provided to the second moving block 32b to linearly move the second moving block 32b provided to the LM (Linear Motion) guide 32c along the second LM (Linear Motion) guide 32c. Here, the second actuator 32d may utilize any one of a pneumatic cylinder and a ball screw moving mechanism.

As shown in FIG. 2, to reflect the light reflected by the prism assembly 31, which is vertically moved by the second moving block 32b, towards the external surface of the test object 1 or to reflect the reflected light towards the prism assembly 31, the first mirror part 40 and the second mirror part 50 are provided in both ends of the prism part 30.

To receive the light reflected from the prism assembly of the prism part to be directed towards the external surface of the test object 1 or to reflect the light reflected from the external surface of the test object 1, the first mirror part 40 includes a first mirror 41 and a third filter 42.

The first mirror 41 is inclined to emit the light generated from the projection part 10 towards the external surface of the test object 1 when the generated light is reflected from the prism assembly 31, or to reflect the light reflected from the external surface of the test object 1 towards the prism assembly 31. The third filter 42 is provided between the prism assembly 31 of the prism part 30 and the first mirror 41 to improve a signal-to-noise ratio (SNR) of the light.

The second mirror part 50 includes a second mirror 51 and a fourth filter 52. Here, a configuration and operation of the second mirror part 50 is similar to the first mirror part 40 and thus detailed descriptions related thereto will be omitted. The fourth filter 52 is provided between the prism assembly 31 of the prism part 30 and the second mirror 51. Also, the third filter 42 and the fourth filter 52 provided to the first mirror part 40 and the second mirror part 50 respectively or the first filter 15 and the second filter 23 provided to the projection 10 and the viewing part 20 utilize any one of a band pass filter and a cutoff filter.

Hereinafter, an operation of a 3D shape measuring apparatus according to the present invention, constructed as above, will be described with reference to FIGS. 2, 5a, 5b, 6a, and 6b.

To measure the external surface of the test object 1 placed on the inspection table 1a shown in FIG. 2, the first prism mirror 31a and the second prism mirror 31b of the prism assembly 31 are linearly moved by the second linear motion mechanism 32 to be positioned between the projection part 10 and the viewing part 20.

Figure 5A:
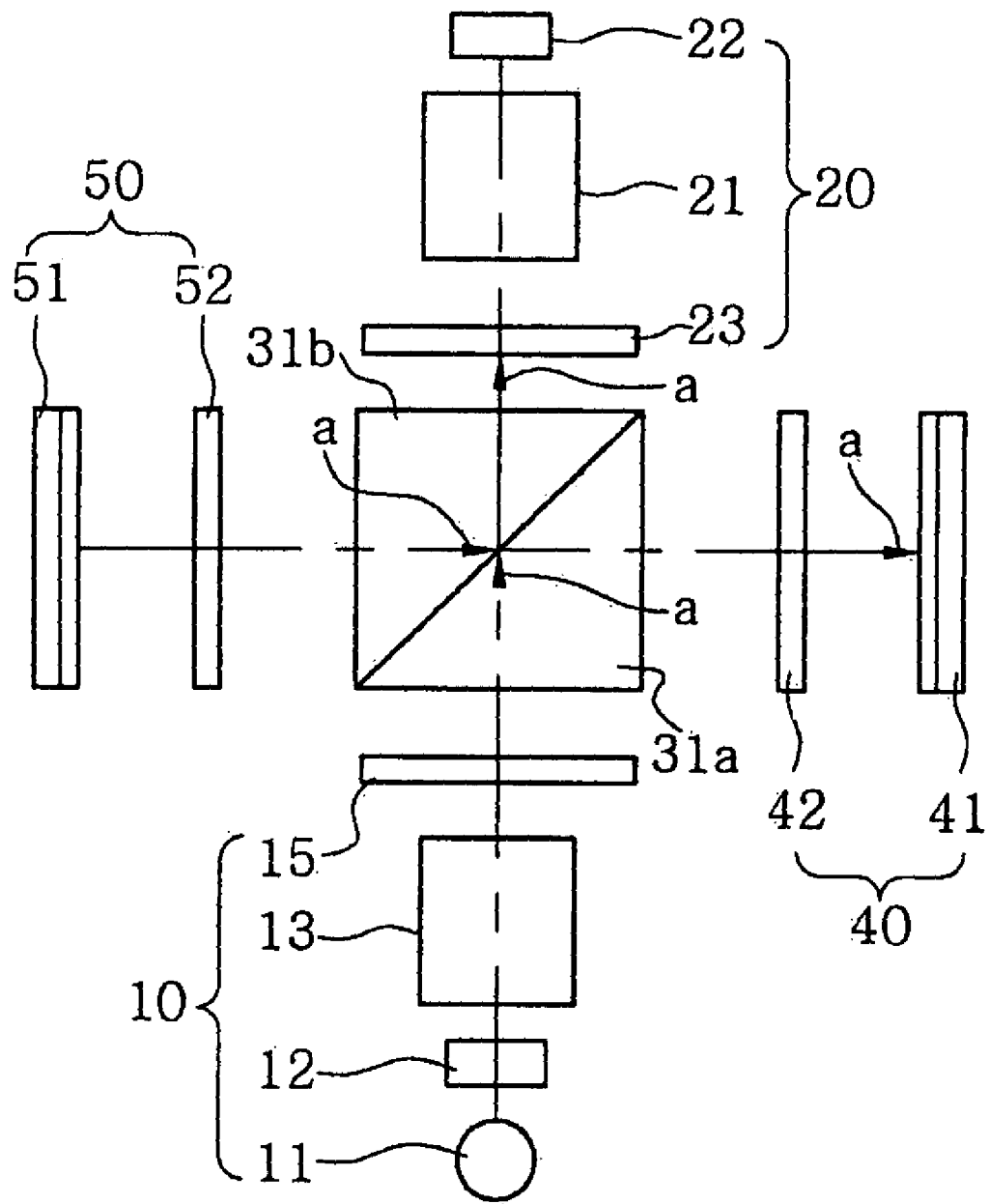
FIGS. 5a and 5b are top views illustrating the 3D shape measuring apparatus of FIG. 2.
Figure 6A:
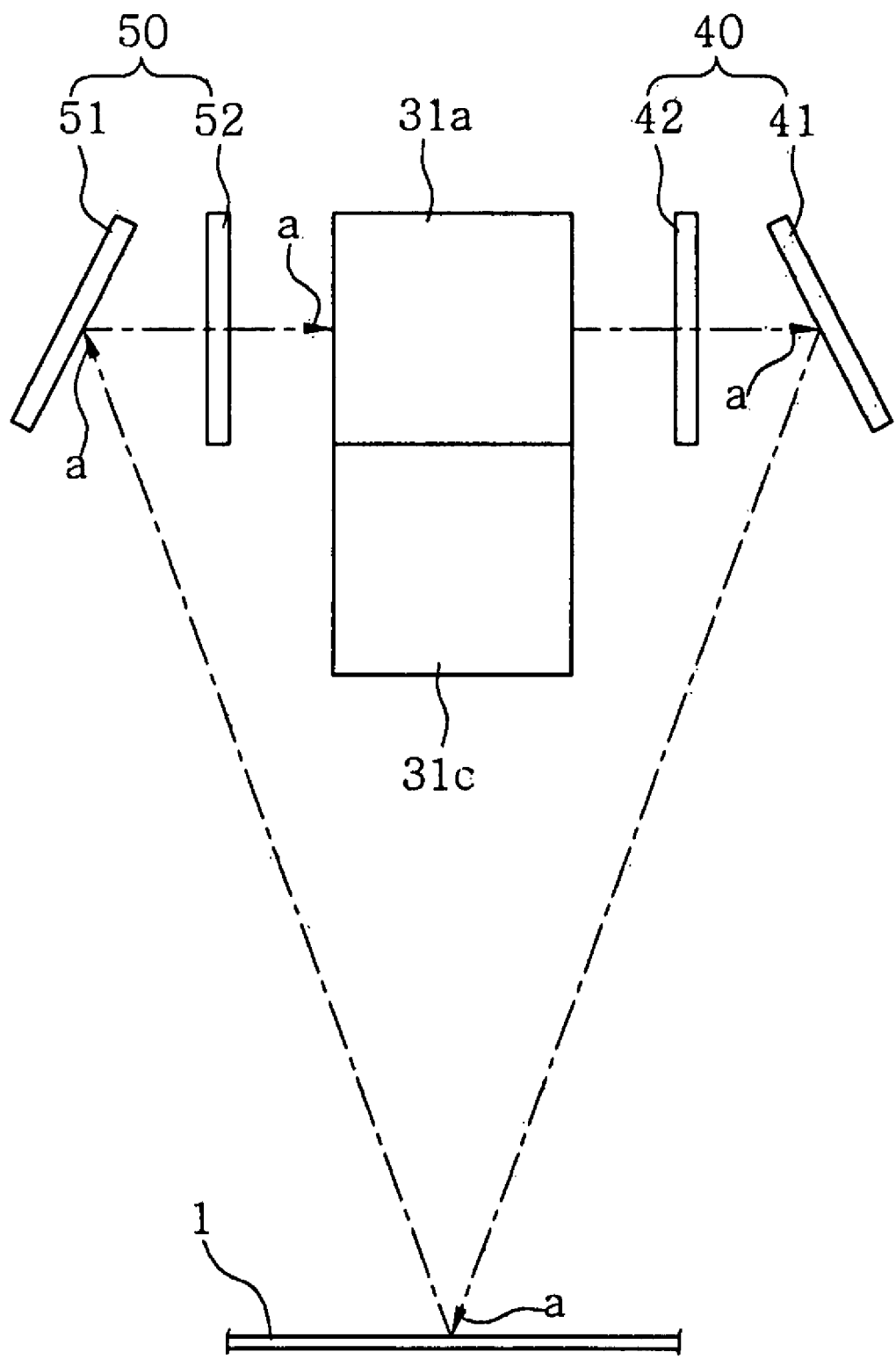
FIGS. 6a and 6b are side views illustrating the 3D shape measuring apparatus of FIG. 2.

By positioning the first prism mirror 31a and the second prism mirror 31b between the projection part 10 and the viewing part 20, the light generated from the projection part 10 is emitted towards the first prism mirror 31a of the prism assembly 31 via the hole 32 formed on the connecting member 32a and then the light reflected by the first prism mirror 31a is directed towards the first mirror part 40. The first mirror part 40 reflects the emitted light towards the external surface of the test object 1, and the light reflected from the external surface of the test object 1 is emitted towards the second mirror part 50. The second mirror part 50 reflects the emitted light towards the second prism mirror 31b of the prism assembly 31. The second prism mirror 31b reflects the light towards the viewing part 20, and the viewing part 20 takes a picture of the light and inspects one surface of the test object 1. Specifically, as shown in FIGS. 5a and 6a, the light generated from the projection part 10 is circulated along an arrow direction a, so that the viewing part 20 takes a picture of and inspects one surface of the test object 1.

Figure 5B:
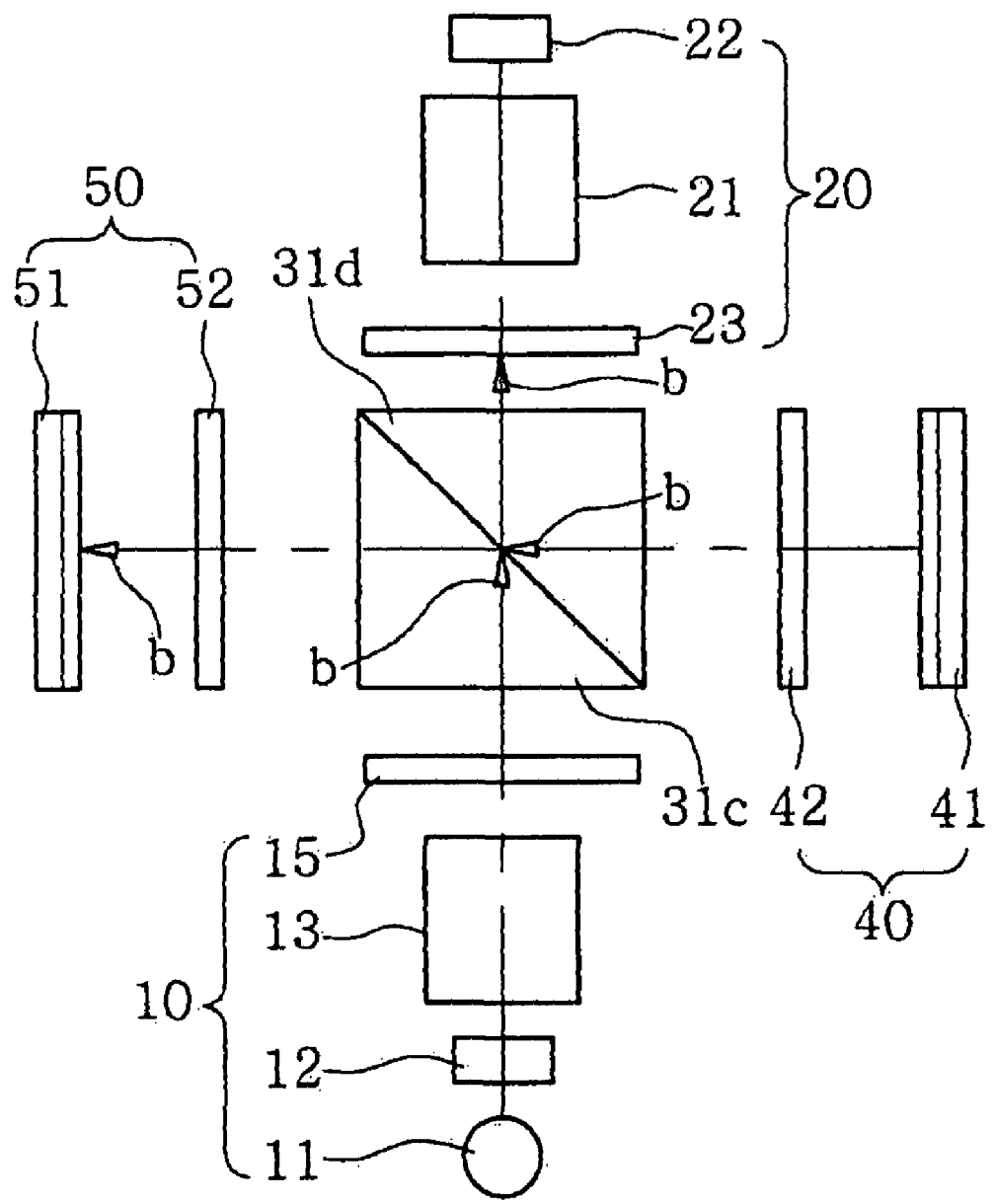
Figure 6B:
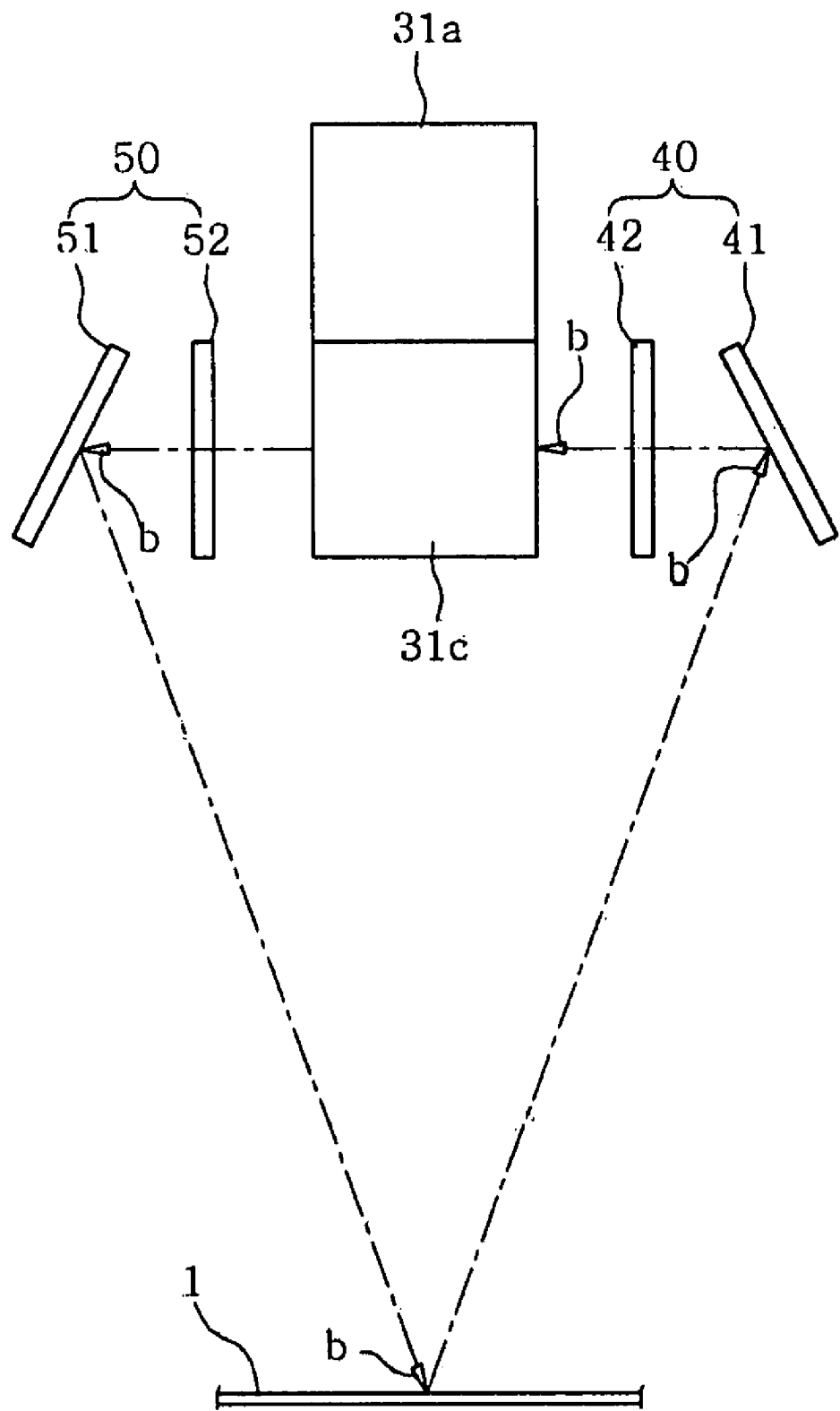

When an inspection with respect to one surface of the test object 1 is completed, as shown in FIGS. 2 and 6b, the prism assembly 31 is vertically moved by the second linear motion mechanism 32 to position the third prism mirror 31c and the fourth prism mirror 31d between the projection part 10 and the viewing part 20. By positioning the third prism mirror 31c and the fourth prism mirror 31d between the projection part 10 and the viewing part 20, the light generated from the projection part 10 is reflected by the third prism mirror 31c and then emitted towards the second mirror part 50. The second mirror part 50 reflects the emitted light towards the external surface of the test object 1, and the light reflected from the external surface of the test object 1 is reflected from the first mirror part 40 and then directed towards the fourth prism mirror 31d. The fourth prism mirror 31d reflects the emitted light towards the viewing part, and the fourth prism mirror 31d reflects the emitted light towards the viewing part 20. The viewing part 20 takes a picture of the emitted light and inspects the external surface of the test object 1. Specifically, as shown in FIGS. 5b and 6b, the light generated from the projection part 10 is inverse-circulated along an arrow direction b, which is an opposite direction to the arrow direction a, so that the viewing part 20 takes a picture of and inspects another surface of the test object 1.

Another embodiment of the prism part 30 of the present invention, which is utilized to remove a shadow and inspect the light reflected from the external surface of the test object 1 by alternatively inspecting one surface and another surface of the external surface of the test object 1, will be described with reference to FIGS. 7a and 7b.

II. Second Embodiment

Figure 7A:
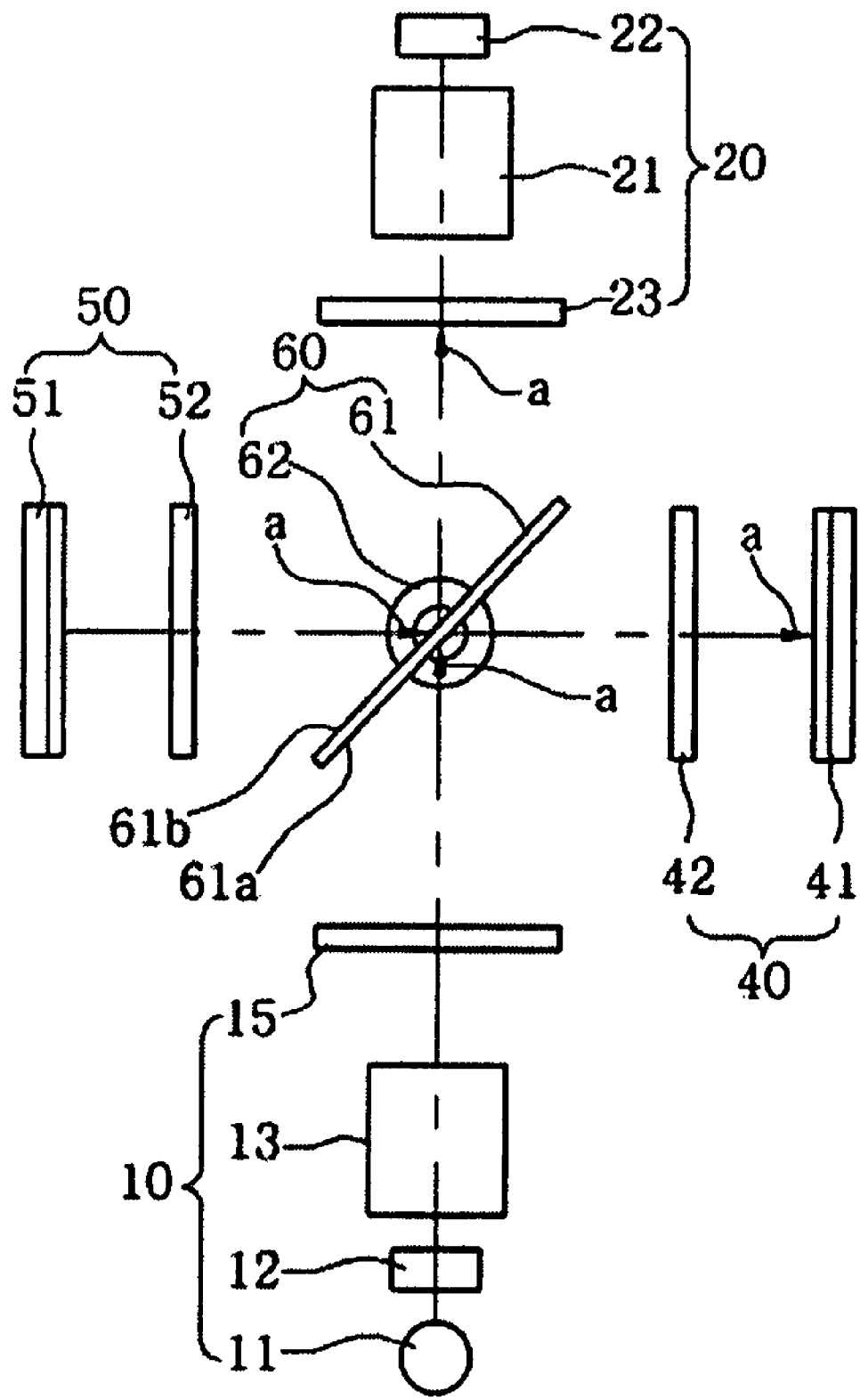
FIGS. 7a and 7b are top views illustrating a 3D shape measuring apparatus according to a second embodiment of the present invention.
Figure 7B:
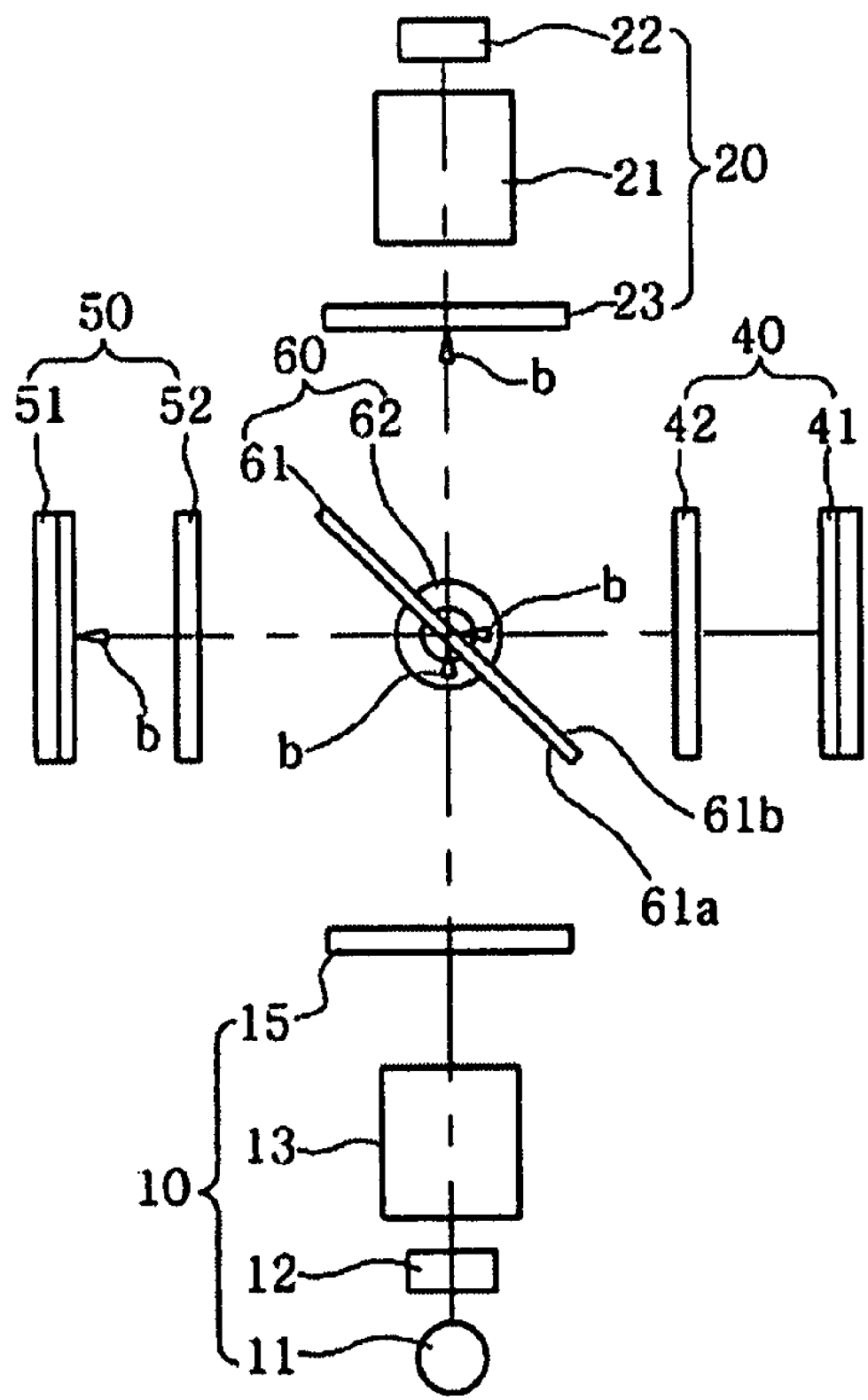

A rotating mirror mechanism 60 shown in FIGS. 7a and 7b includes a rotating mirror 61 and a rotating mechanism 62 to be capable of performing an identical operation to the prism part 30 shown in FIG. 2.

The rotating mirror 61 is rotated by the rotating mechanism 60, such as a motor (not shown), receives the light generated from the projection part 10 to selectively emit towards the first mirror part 40 and the second mirror part 50, and receives the selectively reflected light via the first mirror part 40 and the second mirror part 50 to reflect towards the viewing part 20.

For example, as shown in FIG. 7a, when the rotating mirror 61 is rotated by the rotating mechanism 62 and then stopped, the light generated from the projection part 10 is reflected from one surface 61a of the rotating mirror 61 towards the first mirror part 40, and then directed towards the test object 1 as shown in FIG. 2. The light emitted towards the external surface of the test object 1 is reflected from the external surface of the test object 1 and then emitted towards the second mirror part 50. The emitted light towards the second mirror part 50 is reflected from another surface 61b of the rotating mirror 61 and then directed towards the viewing part 20 whereby the viewing part 20 takes a picture of and inspects one surface of the test object 1. Specifically, the viewing part 20 may inspect one surface of the test object 1 by circulating the light generated from the viewing part 10 into the arrow direction a shown in FIG. 7a.

To inspect another surface of the test object 1, the rotating mirror 61 is clockwise rotated by the rotating mechanism 62 and positioned as shown in FIG. 7b. When the rotating mirror 61 is positioned as shown in FIG. 7b, the light is generated from the projection part 10, and the generated light is reflected from one surface 61a of the rotating mirror 61, and directed towards the external surface of the test object 1 by the second mirror part 50. Also, when the light is emitted towards the external surface of the test object 1 and then reflected therefrom, the reflected light is emitted towards another surface 61b of the rotating mirror 61 by the first mirror part 40. The emitted light towards another surface 61b of the rotating mirror 61 is reflected by the rotating mirror 61 and emitted towards the viewing part 20 whereby another surface of the test object 1 may be taken. Specifically, the light generated from the projection part 10 is inverse circulated along the arrow direction b, which is an opposite direction to the arrow direction a shown in FIG. 7a, so that the viewing part 20 takes a picture of another surface of the test object 1. Through the operation, the 3D shape of the test object 1 may be measured.

As described above, a 3D shape measuring apparatus according to the present invention may remove a shadow, which may occur when measuring a 3D shape of the test object 1, and also may measure the light reflected from the test object 1, by using the prism part 30 or the rotating mirror mechanism 60. Therefore, an optical system of the 3D shape measuring apparatus may have a simple configuration.

As described above, a 3D shape measuring apparatus according to the present invention may remove a shadow occurring when inspecting the external surface of a measuring object and also utilize a prism part or a rotating mirror mechanism when sensing the reflected light. Therefore, an optical system of the 3D shape measuring apparatus may have a simple configuration and thus a manufacturing cost of the 3D shape measuring apparatus may be reduced.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A 3-dimensional (3D) image measuring apparatus comprising:
    a projection part generating a light;
    an image formation part sensing the light;
    a prism part being provided between the projection part and the viewing part; and
    a first mirror part and a second mirror part being provided in both ends of the prism part respectively,
    wherein the prism part selectively transmits the light generated from the projection part to the first mirror part and the second mirror part to be directed towards a surface of a test object, and transmits a reflected light to the viewing part.

2. The apparatus of claim 1, wherein the projection part comprises:
    a light source generating the light;
    a first grating changing the light generated from the light source into a light according to a moire pattern, and transmitting the changed light;
    a projection lens transmitting the light having passed through the first grating to the prism part;
    a first filter filtering the light transmitted via the projection lens and directing the filtered light to the prism part, and
    a first linear motion mechanism moving the first grating.

3. The apparatus of claim 2, wherein the first linear motion mechanism comprises:
    a first moving block including the first grating;
    a first LM (Linear Motion) guide guiding the first moving block; and
    a first actuator linearly moving the first moving block along the first LM (Linear Motion) guide.

4. The apparatus of claim 3, wherein the first actuator employs a piezoelectric (PZT) actuator.

5. The apparatus of claim 2, wherein the first linear motion mechanism employs a flexure stage.

6. The apparatus of claim 5, wherein the flexure stage comprises:
    a flexure body including a first installation hole and a second installation hole;
    a second grating being placed on the first installation hole formed on the flexure body; and
    a PZT actuator being inserted into the second installation hole formed on the flexure body.

7. The apparatus of claim 2, wherein the first filter utilizes any one of a band pass filter and a cutoff filter.

8. The apparatus of claim 1, wherein the viewing part comprises:
    a second filter filtering and transmitting the light, which is directed from the prism part;
    a viewing lens receiving the filtered light via the second filter and transmitting the received light; and
    a camera sensing the transmitted light from the image formation lens.

9. The apparatus of claim 8, wherein the second filter utilizes anyone of a band pass filter and a cutoff filter.

10. The apparatus of claim 1, wherein the prism part comprises:
    a prism assembly receiving the generated light from the projection part and selectively directing the received light to the first mirror part and the second mirror part, and receiving the selectively reflected light via the first mirror part and the second mirror part and directing the received light towards the viewing part; and
    a second linear motion mechanism linearly moving the prism assembly into a vertical direction.

11. The apparatus of claim 10, wherein the prism assembly comprises:
    a first prism mirror reflecting the light generated from the projection part towards the first mirror part;
    a second prism mirror reflecting the light reflected via the second mirror part towards the viewing part;
    a third prism mirror reflecting the light generated from the projection part towards the second mirror part; and
    a fourth prism mirror reflecting the light reflected via the first mirror part towards the viewing part.

12. The apparatus of claim 10, wherein the second linear motion mechanism comprises:
    a connecting member including the prism assembly on its one surface, and having a hole to pass the light generated from the projection part;
    a second moving block being provided in one end of the connection member;
    a second LM (Linear Motion) guide guiding the second moving block; and
    a second actuator linearly moving the second moving block along the second LM (Linear Motion) guide.

13. The apparatus of claim 12, wherein the second actuator utilizes any one of a pneumatic cylinder and a ball screw moving mechanism.

14. The apparatus of claim 1, wherein the prism part employs a rotating mirror mechanism.

15. The apparatus of claim 14, wherein the rotating mirror mechanism comprises:
    a rotating mirror receiving the light generated from the projection part to selectively emit towards the first mirror part and the second mirror part, and receiving the selectively reflected light via the first mirror part and the second mirror part to reflect towards the viewing part; and
    a rotating mechanism rotating the rotating mirror.

16. The apparatus of claim 1, wherein the first mirror part comprises:

a first mirror receiving a reflected light from a prism part to reflect towards a surface of a test object or reflecting the reflected light from the surface of the test object towards the prism part; and a third filter being provided between the prism part and the first mirror.

17. The apparatus of claim 16, wherein the third filter utilizes any one of a band pass filter and a cutoff filter.

18. The apparatus of claim 1, wherein the second mirror part comprises:

a second mirror receiving a reflected light from the prism part to reflect towards a surface of the test object or reflecting the reflected light from the surface of the test object towards the prism part; and a fourth filter being provided between the prism part and the second mirror.

19. The apparatus of claim 18, wherein the fourth filter utilizes any one of a band pass filter and a cutoff filter.

* * * * *